US008799222B2

(12) United States Patent
Marathe et al.

(10) Patent No.: US 8,799,222 B2
(45) Date of Patent: *Aug. 5, 2014

(54) HOST BASED SOFTWARE BLOCK LEVEL REPLICATION USING METADATA INDICATING CHANGED DATA OBJECTS AT SOURCE AND SECONDARY NODES

(75) Inventors: Shailesh Marathe, Pune (IN); Ashish Gawali, Pune (IN); Niranjan Pendharkar, Pune (IN)

(73) Assignee: Symantec Corporation, Mountain View, CA (US)

( * ) Notice: Subject to any disclaimer, the term of this patent is extended or adjusted under 35 U.S.C. 154(b) by 336 days.

This patent is subject to a terminal disclaimer.

(21) Appl. No.: 12/971,498

(22) Filed: Dec. 17, 2010

(65) Prior Publication Data

US 2012/0158659 A1    Jun. 21, 2012

(51) Int. Cl.
*G06F 7/00* (2006.01)
*G06F 17/00* (2006.01)
(52) U.S. Cl.
USPC .......................................................... 707/639
(58) Field of Classification Search
USPC .......................................................... 707/639
See application file for complete search history.

(56) References Cited

U.S. PATENT DOCUMENTS

| 6,427,121 | B2 * | 7/2002 | Brodie ........................... 701/485 |
| 6,643,671 | B2 * | 11/2003 | Milillo et al. ................. 707/622 |
| 8,352,422 | B2 * | 1/2013 | Prahlad et al. ................ 707/609 |
| 2008/0320261 | A1 * | 12/2008 | Colgrove et al. ............. 711/162 |
| 2009/0138522 | A1 * | 5/2009 | Day et al. ...................... 707/200 |
| 2009/0327568 | A1 * | 12/2009 | Wayda et al. ................. 710/306 |
| 2010/0161932 | A1 * | 6/2010 | Stern et al. .................... 711/202 |
| 2011/0107025 | A1 * | 5/2011 | Urkude et al. ................ 711/112 |

* cited by examiner

*Primary Examiner* — Tony Mahmoudi
*Assistant Examiner* — Muluemebet Gurmu
(74) *Attorney, Agent, or Firm* — Wilmer Cutler Pickering Hale and Dorr LLP

(57) ABSTRACT

A host-based replication snapshot method. The method includes synchronizing a set of data objects stored at both a replication source node and a secondary node. The method further includes identifying changed data objects out of the set of data objects from the replication source node that have been modified during a time period between a first time and a subsequent second time. Metadata indicating the changed data objects from the replication source node is transmitted to the secondary node. A snapshot is then generated at the second time on the secondary node by using the metadata.

20 Claims, 11 Drawing Sheets

HOST BASED SOFTWARE BLOCK LEVEL REPLICATION USING METADATA INDICATING CHANGED DATA OBJECTS AT SOURCE AND SECONDARY NODES

FIELD OF THE INVENTION

The present invention is generally related to digital computer, more particularly, to a system and method for periodically replicating data in volumes.

BACKGROUND OF THE INVENTION

Information drives business. Companies today rely to an unprecedented extent on online, frequently accessed, constantly changing data to run their businesses. Unplanned events that inhibit the availability of this data can seriously damage business operations. Additionally, any permanent data loss, from natural disaster or any other source, will likely have serious negative consequences for the continued viability of a business. Therefore, when disaster strikes, companies must be prepared to eliminate or minimize data loss, and recover quickly with useable data.

Replication technology is primarily used for disaster recovery and data distribution. Periodic replication is one technique utilized to minimize data loss and improve the availability of data in which a point-in-time copy of data is replicated and stored at one or more remote sites or nodes. In the event of a site migration, failure of one or more physical disks storing data, or failure of a node or host data processing system associated with such a disk, the remote replicated data copy may be utilized. In addition to disaster recovery, the replicated data enables a number of other uses, such as, for example, data mining, reporting, testing, and the like. In this manner, the replicated data copy ensures data integrity and availability. Additionally, periodic replication technology is frequently coupled with other high-availability techniques, such as clustering, to provide an extremely robust data storage solution.

Performing a replication operation, backup operation, or the like on a large data set may take a significant amount of time to complete. The sheer size of the data set makes a replication operation take a significant amount of time. During this time, if the data set is maintained live, a problem with intervening accesses to the data set will have to be addressed. For example, on a large enterprise class system, there may be thousands of writes to that data set while it is being backed up or replicated. This factor can create data corruption hazards.

One approach to safely backing up live data is to temporarily disable write access during the backup, for example, by configuring a locking API provided by the file system to enforce exclusive read access. Such an approach might be tolerable for low-availability systems (e.g., desktop computers and small workgroup servers, where regular downtime is acceptable). Enterprise class high-availability 24/7 systems, however, cannot bear service stoppages.

A snapshot, or checkpoint, operation is often used to avoid imposing downtime. To avoid downtime, a high availability system may instead perform the replication or backup on a snapshot, which is essentially a read-only copy of the data set frozen at a point in time, and allow applications to continue writing to their data. Thus the term snapshot is used to refer to the data as they were at a particular point in the past.

Data storage required for applications such as file systems and databases are typically allocated from one or more storage devices that are maintained as a "volume". The "volume" may serve as a logical interface used by an operating system to access data stored on one or more storage media using a single instance of a file system. Thus, a volume may act as an abstraction that essentially "hides" storage allocation and (optionally) data protection/redundancy from the application. An application can store its data on multiple volumes. The content of a volume is accessed using fixed sized data units called blocks.

Disaster recovery methods typically need to function on frozen time images. Frozen images are required for carrying out any fire drill activities or doing any auxiliary processing on the DR site. In configurations where the LUNs are replicated using HW replication technology the only available solution is using array level snapshots. However this comes at an additional cost of array level snapshot license. Instead if the host based LVM (Logical Volume Manager) could provide the ability to create snapshots on the secondary, then it would be an cost effective solution to the customers.

One method involves using array based snapshots. However, as mentioned in the problem statement this comes at an additional cost. Another method may involve using host based replication. However, this consumes additional resources on the primary server.

SUMMARY OF THE INVENTION

Embodiments of the present invention provide a host-based method for replicating snapshot volumes independent of any hardware-based application process.

In one embodiment, the present invention is implemented as a host-based replication snapshot method. The method includes synchronizing a set of data objects stored at both a replication source node and a secondary node. The method further includes identifying changed data objects out of the set of data objects from the replication source node that have been modified during a time period between a first time and a subsequent second time. Metadata indicating the changed data objects from the replication source node is transmitted to the secondary node. A snapshot is then generated at the second time on the secondary node by using the metadata.

In one embodiment, an application is mounted onto the snapshot on the secondary node.

In one embodiment, the application is a fire drill application.

In one embodiment, the metadata is used to identify data objects that have been modified out of the set of data objects during the time period between the first time and the subsequent second time.

In one embodiment, the set of data objects comprise a file system of a LUN (logical unit number) of a storage array, and wherein the storage array supports hardware-based replication.

In one embodiment, a replication process implemented between the repetition source node and the secondary node is synchronous, asynchronous or periodic.

In one embodiment, a change tracking agent is instantiated on the replication source node for identifying changed data objects out of the set of data objects from the replication source node that have been modified during the time period between the first time and the subsequent second time.

In one embodiment, the present invention is implemented as a computer readable storage medium having stored thereon, computer executable instructions that, if executed by a computer system cause the computer system to perform a method that includes synchronizing a set of data objects stored at both a replication source node and a secondary node. The method further includes identifying changed data objects out of the set of data objects from the replication source node that have been modified during a time period between a first time and a subsequent second time. Metadata indicating the changed data objects from the replication source node is transmitted to the secondary node. A snapshot is then generated at the second time on the secondary node by using the metadata.

In one embodiment, the present invention is implemented as a volume replication system. The system includes a computer system having a processor coupled to a computer readable storage media and executing computer readable code which causes the computer system to implement a snapshot manager module. The snapshot manager module synchronizes a set of data objects stored at both the replication source node and at a secondary node, and identifies changed data objects out of the set of data objects from the replication source node that have been modified during a time period between a first time and a subsequent second time. The snapshot manager module transmits metadata indicating the changed data objects from the replication source node to the secondary node, and acknowledges the generating of a snapshot at the second time on the secondary node based on the metadata.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention is illustrated by way of example, and not by way of limitation, in the Figures of the accompanying drawings and in which like reference numerals refer to similar elements.

DETAILED DESCRIPTION OF THE INVENTION

Figure 1:
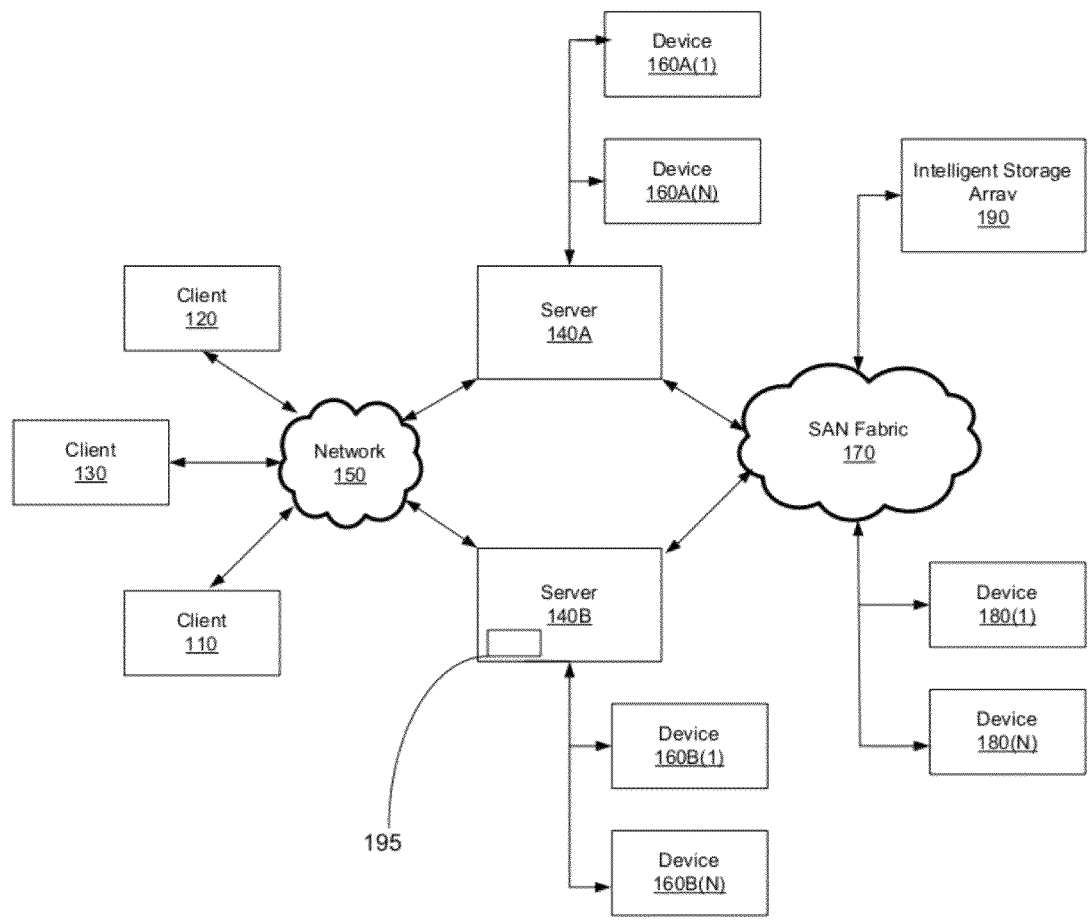
FIG. 1 is a block diagram depicting a network architecture in which client systems, and, as well as storage servers and are coupled to a network in accordance with one embodiment of the present invention.

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "writing" or "storing" or "replicating" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

Embodiments of the present invention implement a method for creating Point-In-Time images on a replication secondary node. In one embodiment, the present invention is implemented as a host-based replication snapshot method. The method includes synchronizing a set of data objects stored at both a replication source node and a secondary node. The method further includes identifying changed data objects out of the set of data objects from the replication source node that have been modified during a time period between a first time and a subsequent second time. Metadata indicating the changed data objects from the replication source node is transmitted to the secondary node. A snapshot is then generated at the second time on the secondary node by using the metadata. As used herein, it should be noted that the data objects would comprise "blocks" of data. The blocks being changed/tracked could hold data comprising a file system or data comprising a database, or for that matter, a number of different applications. The method does the tracking at block level and is expected to work across applications In this manner, embodiments of the present invention can implement methods for creating Point-In-Time images on replication secondary nodes for deployments using, for example, third party products for replicating the data. For example, in one embodiment, an application is mounted onto the snapshot on the secondary node. Furthermore, in one embodiment, the application is a fire drill application (e.g., as used to prove the functionality of disaster recovery protocols).

In one embodiment, the functionality of the present invention is used to create point in time images, or snapshots, on secondary sites where the replication is achieved through a third-party replication product. Hence, even though array based storage devices may be used to instantiate LUNs and these array based storage devices implement their own hardware-based replication, a third-party application can be used to generate a software based replication snapshot on the secondary node. In accomplishing this functionality, embodiments of the present invention incorporate features for tracking incremental changes on the primary site, or replication source. This information is then used on the secondary site for doing a snapshot merge.

Figure 2:
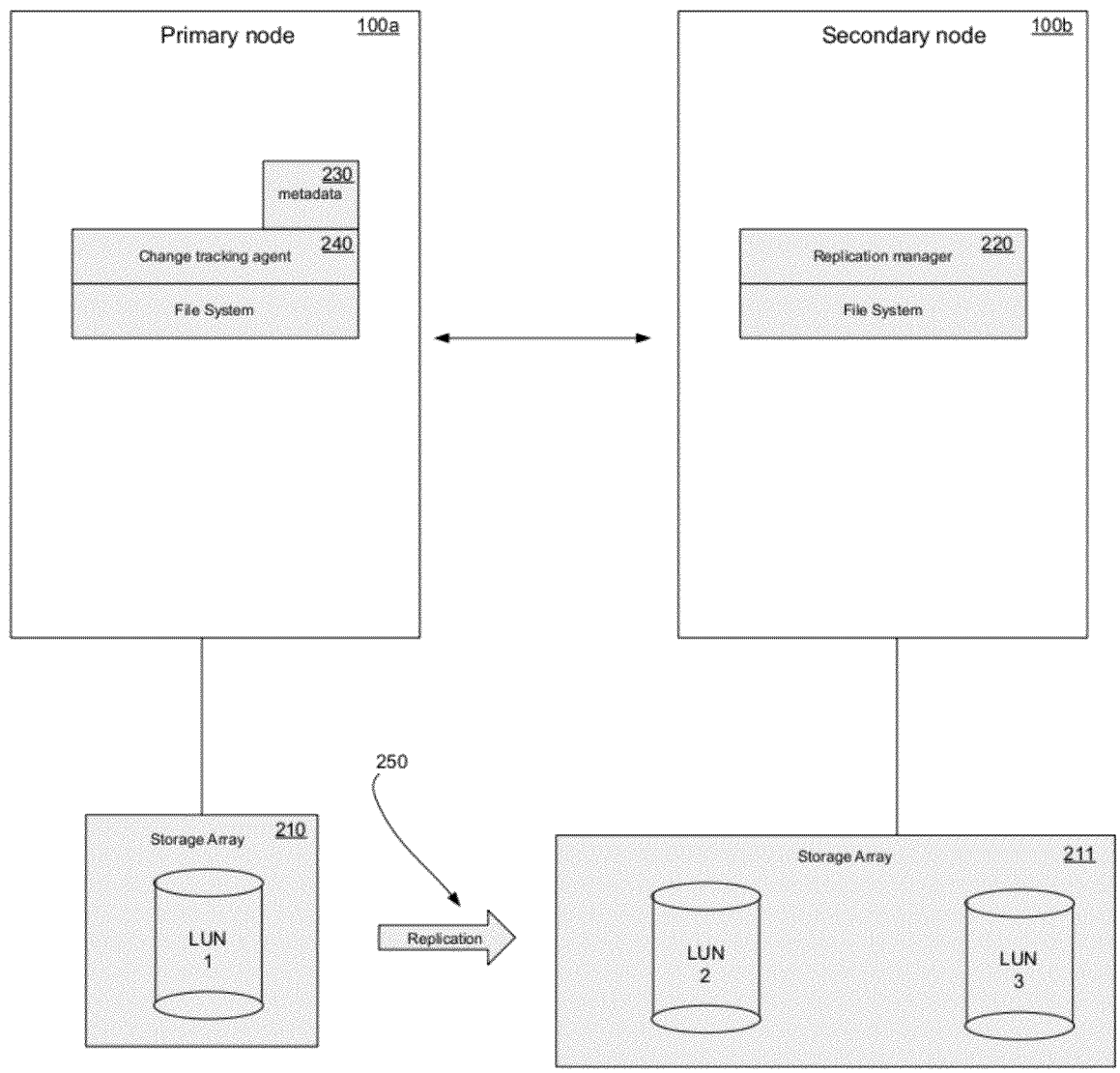
FIG. 2 shows an overview diagram depicting a host-based software block level replication system in accordance with one embodiment of the present invention.
Figure 3:
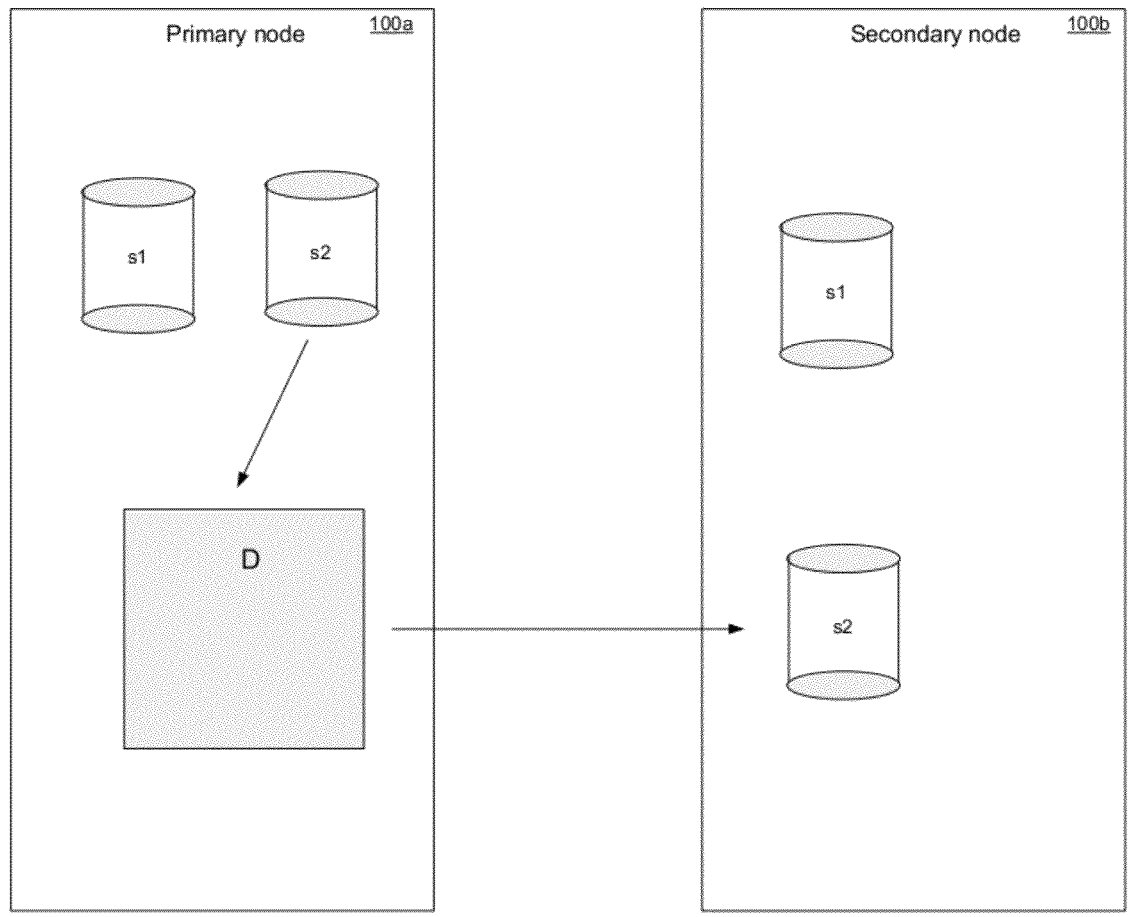
FIG. 3 shows a periodic replication operation as implemented between the primary node (e.g., at the primary site) and the secondary node (e.g., at the secondary site) including snapshots s1 and s2 in accordance with one embodiment of the present invention.
Figure 4:
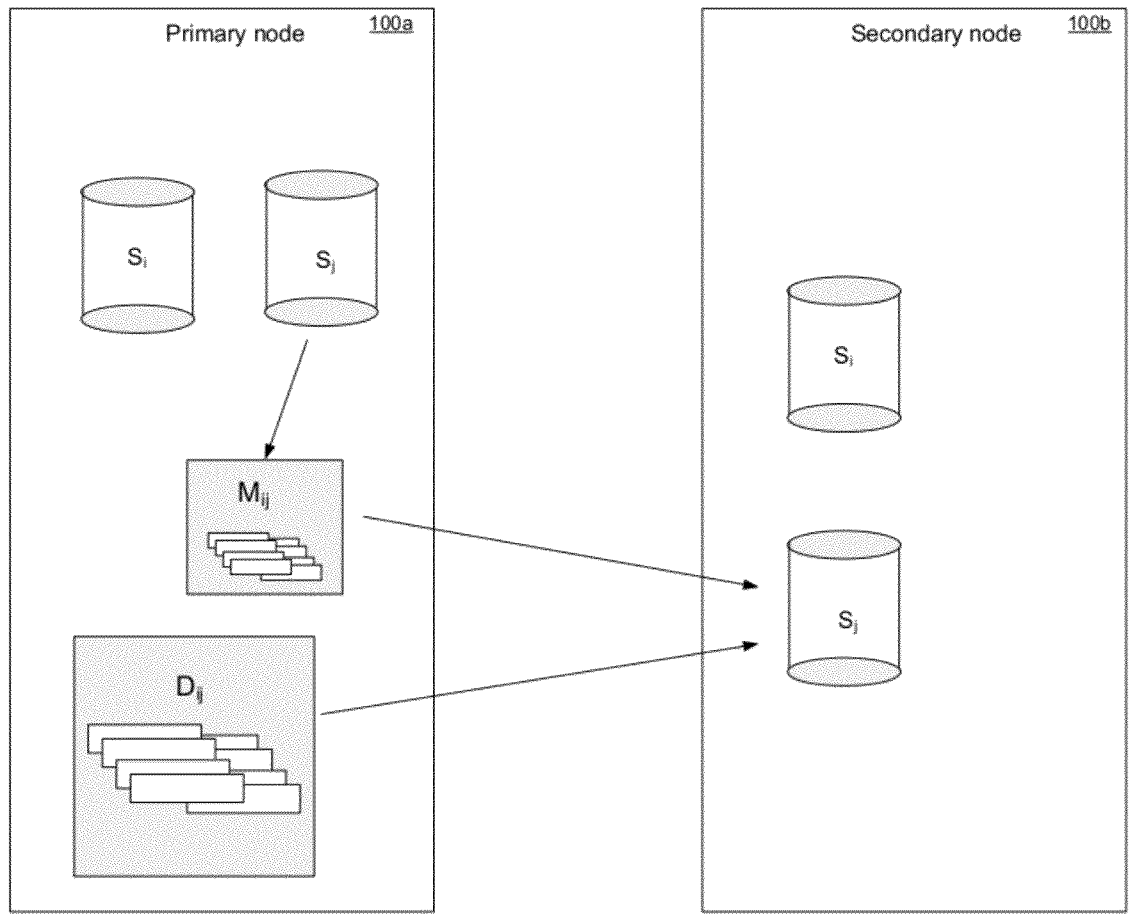
FIG. 4 shows a diagram depicting a partial replication operation as implemented between the primary node and the secondary node in accordance with one embodiment of the present invention.
Figure 5:
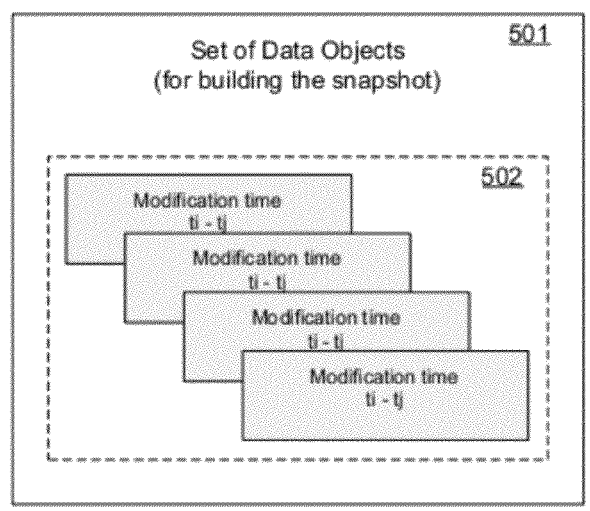
FIG. 5 shows a diagram of a set of data objects (e.g., Dij) as used for building a snapshot in accordance with one embodiment of the present invention.

As described above, many applications require a frozen image in order to operate. As described above, frozen images are required for carrying out fire drill activities and/or doing any auxiliary processing on a disaster recovery site. In configurations where the LUNs are replicated using HW replication technology solutions are made available sides simply using array level snapshots. The additional cost of array level snapshot licenses, for example, can be completely avoided. In one embodiment, a host based logical volume manager provides the ability to create snapshots on the secondary node, thereby providing a cost effective solution to the customers. FIG. 1 below provides an overview of an exemplary network architecture 100 in which embodiments of the present invention can be used. FIG. 2 provides an overview diagram of the host based software block level replication process of embodiments of the present invention. FIGS. 3, 4 and 5 diagram an exemplary snapshot process that is compatible with embodiments of the present invention.

FIG. 1 is a block diagram depicting a network architecture 100 in which client systems 110, 120 and 130, as well as storage servers 140A and 140B are coupled to a network 150 in accordance with one embodiment of the present invention. The storage servers 140A and 140B can be used to instantiate one or more virtual machines. A storage server 140A is further depicted as having storage devices 160A(1)-(N) directly attached, and storage server 140B is depicted with storage devices 160B(1)-(N) directly attached. Storage servers 140A and 140B are also connected to a SAN fabric 170, although connection to a storage area network is not required for operation of the disclosure. SAN fabric 170 supports access to storage devices 180(1)-(N) by storage servers 140A and 140B, and so by client systems 110, 120 and 130 via network 150. SAN fabric 170 also supports access to a storage array 190, which is also shown as an example of a specific storage device. Certain functionality of embodiments of the present invention are implemented via a replication manager 195, which is shown as instantiated on the server 140B.

Client computer systems 110, 120 and 130 are communicatively coupled via the network 150. Client systems 110, 120 and 130 are able to access information on data server 140A or 140B using, for example, a web browser or other client software (not shown). Such a client allows client systems 110, 120 and 130 to access data hosted by storage server 140A or 140B or one of storage devices 160A(1)-(N), 160B(1)-(N), 180(1)-(N) or storage array 190. Additionally, FIG. 1 depicts the use of a network such as the Internet for exchanging data, but the present disclosure is not limited to the Internet or any particular network-based environment. It should be noted that although two data server nodes 140A and 140B are shown, embodiments of the present invention can function with highly scalable distributed computer systems having hundreds of nodes, or more (e.g., cloud computing system, etc.).

FIG. 2 shows an overview diagram depicting a host-based software block level replication system in accordance with one embodiment of the present invention. As depicted in FIG. 2, the system includes a primary node 200a and a secondary node 200b. The primary node is connected to storage array 210 and the secondary node is connected to the storage array 211. Metadata 230 is used to keep track of various data blocks that have changed.

In the FIG. 2 embodiment, the functionality of the present invention is used to create point in time images, or snapshots, on the secondary node at the secondary site where the replication can be achieved through a third-party replication product. Hence, even though array based storage devices 210 and 211 may be used to instantiate LUNs and these array based storage devices implement their own hardware-based replication, a third-party application (e.g., replication manager 220) can be used to generate a software based replication snapshot on the secondary node. This aspect is illustrated in FIG. 2 by the arrow 250 indicating the replication process occurring between LUNs L1 and L2.

In one embodiment, the functionality of the present invention is implemented as follows. First, replication is set up between LUNS L1 (e.g., in storage array 210) and L2 (e.g., in storage array to 11). In one embodiment, L2 implements a mirror of L1. To initialize the process, L2 is allowed to sync completely from L1.

During a first iteration of the replication process, a change tracking object (S0) is created on the primary volume to track changes happening to the volume (e.g., LUN L1). At a subsequent time, replication is stopped. A snapshot mirror is then added to L2 using LUN L3. It should be noted that L3 has no relationship at an array level with L2. The added snapshot mirror would do full sync with L2. A snapshot is then created using the mirror added above. Subsequently, replication between L1 and L2 is resumed.

For subsequent iterations of the replication process, another change tracking object (S1) is created on the primary volume to track changes happening to the volume. The changes are recorded using the metadata 230. Replication is subsequently stopped and another change tracking object (S2) is created on the primary volume to track changes happening to the volume. The snapshot is synchronized from the primary using the changes tracked by S0 and S1. Additionally, changes that may have occurred on the snapshot are also considered during the synchronization. The snapshot is then re-created, and replication is resumed.

It should be noted that the change tracking agent 240 functions by performing change tracking on the primary. It should also be noted that the replication manager 220 functions as a snapshot provider on the secondary. It should also be noted that the data objects generally comprise "blocks", wherein the blocks being changed/tracked could hold a file system data or database data or, for example, data for a number of other applications. The change tracking agent 240 does the tracking at the block level and functions across a number of different applications.

It should be noted that embodiments of the present invention are compatible with a number of different types of replication processes. For example, that replication process that occurs between the primary node and the secondary node can be synchronous, asynchronous or periodic/episodic.

In one embodiment, a VxVM stack (e.g., from Symantec Inc.) is instantiated on the primary node as well as the secondary node. However, it should be noted that a number of different software stacks can be utilized with the functionality of embodiments of the present invention. A replication process compatible with embodiments of the present invention is now described in the discussions of FIGS. 3 through 8 below.

FIG. 3 shows a periodic replication operation as implemented between the primary node (e.g., at the primary site) and the secondary node (e.g., at the secondary site) including snapshots s1 and s2 in accordance with one embodiment of the present invention. The FIG. 3 embodiment includes functionality that enables a secondary site to make snapshots of one or more storage objects (e.g., one or more volumes, etc.) available to the applications at a secondary site before fully replicating them. Applications are mounted on frozen images (i.e., snapshots) of the replica volumes.

The FIG. 3 embodiment advantageously makes a productive utilization of the time it takes to transfer application data from the primary node to the secondary node. For example, in the FIG. 3 scenario, D is the set of blocks that change between snapshot s1 taken at time t1 and snapshot s2 taken at time t2 on the primary site. Let s1 be fully replicated to a secondary site. Conventionally, the applications on the secondary site have to wait for s2 to be fully synchronized to the secondary site by a state of art replication solution before using s2. When s2 is fully replicated, say at time t3, the applications can be mounted on s2. The difference between t3 and t2 depends on the size of D and the replication transfer rate (e.g., the bandwidth of the communications link between the primary node and the secondary node) which in turn depends on the available replication throughput and the load on the primary and replica systems. The time lag can be large enough to lead to idling resources and delaying services on the secondary site, and possibly losing revenue opportunities.

The FIG. 3 embodiment advantageously utilize the characteristic, whereby the applications running on s2 on the secondary node may not need to read the changed blocks immediately, or may need to read a small subset of them. For example, a file system may need to read just the superblock and a small set of other blocks referenced by the superblock during the mount operation. The application running on the volume may mostly read the blocks that are not in D initially. Embodiments of the present invention advantageously implement functionality that allows applications to be mounted on the replicated snapshot volumes as quickly as possible, even if these volumes are not fully replicated.

FIG. 4 shows a diagram depicting a partial replication operation as implemented between the primary node and the secondary node in accordance with one embodiment of the present invention.

As depicted in FIG. 4, the primary node and the secondary node implement a solution that enables the mounting of one or more applications on a volume undergoing replication even though the actual replication process is underway and is not yet complete. For example, as the primary node undergoes a replication process to a secondary node, changed data blocks comprising D are being sent from the primary node to the secondary node. Embodiments of the present invention advantageously send information about the set of changed block address ranges (e.g., metadata) to the secondary site early during the replication process. This metadata enables the secondary node to mount one or more applications onto the unfinished replicated volume. The secondary site can then monitor the execution of the one or more applications and notify the primary site when an application attempts to read blocks that have changed but have not yet been received from the primary site. Upon receiving this notification, the primary site can implement an out of order transfer and transfer the requested blocks ahead of the others.

In the FIG. 4 embodiment, si and sj are the snapshots taken at time ti and tj, respectively, and Mij is the set of block addresses whose blocks are updated between time ti and tj, where j>i. Let Dij be the set of data blocks (i.e., the content) referred by Mij. Mij can be derived from Dij. For example, Dij can be implemented as a stream of change records each of which contains an address, length, and data field whereas Mij can be stream of change records each of which contains an address and length field. It should be appreciated that the number of bytes required to store or transfer for Mij can be easily three orders of magnitude smaller than that for Dij. Therefore, Mij can be transferred quickly to a secondary site. In one embodiment, a snapshot volume sj is defined as partially replicated if Mij is replicated but Dij is not.

After snapshot sj is taken at the primary node, the primary first transfers Mij and then Dij to the secondary node. Having si and Mij, the secondary node can allow applications to mount on sj immediately while the primary is still transferring Dij.

In one embodiment, the secondary node updates Mij dynamically by removing the block ranges corresponding to blocks that are successfully received from the primary site. The Mij at the secondary node represents the set of block addresses for which the blocks are updated between ti and tj but have not yet been replicated. When Mij becomes empty, sj becomes fully replicated.

When an application at the secondary site issues a read request on a block address range on sj which is in Mij, the secondary sends a notification to the primary which then sends the requested blocks to the secondary immediately and removes them from Dij. In one embodiment, it is assumed that the application can tolerate the latency of transferring blocks over the replication network. The application read request on a block address range which is not in Mij and not in sj is satisfied by redirecting the read request to si.

In one embodiment, a new snapshot of a group of volumes can be taken at the primary while the previous snapshot of this group is being replicated. For example, to support such a scenario, the new snapshot (e.g., sk) can be started while sj is still being replicated. The primary does not need to wait for sj to be fully replicated in order start replicating sk. Instead, the primary can immediately transfer Mjk to the secondary which enables the secondary to make sk available to its applications after it receives Mij and Mjk completely. Following Mjk, the primary can start transferring Djk while the transfer of Dij is in progress. At the secondary site, snapshot sj serves the read requests from sk in the same way as it serves the application read requests.

Thus, embodiments of the present invention allow applications to be mounted on a chain of snapshots at a secondary node as long as the metadata for these snapshots has been already transferred to the secondary site.

It should be noted that in the above description, the snapshot sj is replicated after it is created at the primary node. However, the replication data (Dij) for this snapshot is accumulated from time ti to tj. This means that the primary can send Dij while it is accumulated starting at ti. At time tj (i.e., after snapshot sj is created), the primary stops replicating Dij and start replicating Mij which identifies the set of blocks in Dij which remain to be replicated. When Mij is transferred completely, the applications at the secondary site can be mounted on sj and the transfer of Dij is resumed.

FIG. 5 shows a diagram of a set of data objects 501 (e.g., Dij) as used for building a snapshot in accordance with one embodiment of the present invention. As described above, in an example where a snapshot si is taken at time ti (e.g., a first-time) on a replication source, and another snapshot sj is taken at time tj (e.g., a subsequent second time), the difference between tj and ti is the period of replication. To build the snapshot sj on the secondary node, those data objects 502 that got modified between ti and tj need to be transferred from the primary node to the secondary node.

Figure 6:
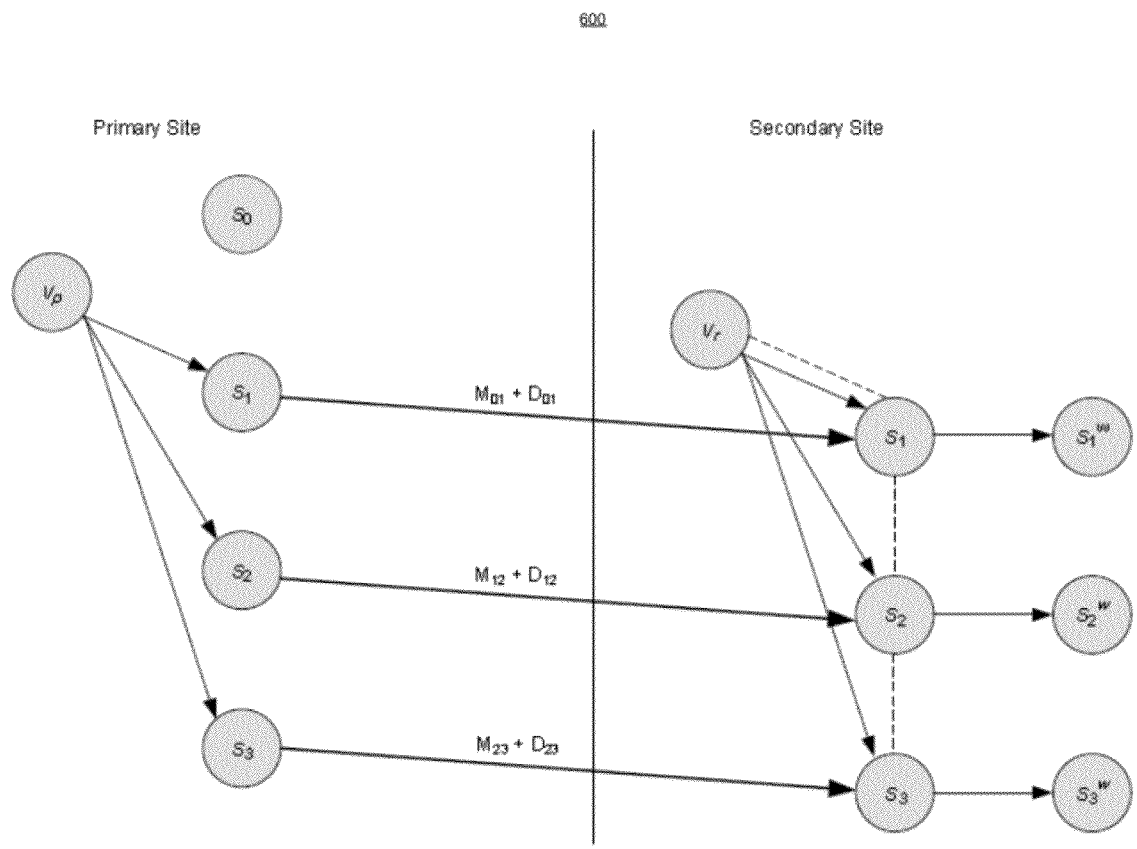
FIG. 6 shows a diagram of a replication snapshot chain process in accordance with one embodiment of the present invention.

FIG. 6 shows a diagram of a replication snapshot chain process 600 in accordance with one embodiment of the present invention.

Applications may need writable snapshot volumes on the secondary node. However, in one embodiment, applications are not allowed to update the blocks of the snapshot volumes because the subsequent snapshots may need to retrieve the original copy of these blocks by following the snapshot chain. The FIG. 5 embodiment shows an implementation providing write access to the applications on the secondary node. To provide a writable snapshot, s1 is treated as a read only volume and a writable snapshot of this volume denoted by s1w is created. Since s1 is a read-only volume, there will be no copy-on-write operation from s1 to s1w. Therefore, s1w will include only the blocks that are updated by the application.

This aspect is illustrated in FIG. 6. FIG. 6 illustrates how to replicate an existing volume vp and its snapshots taken after replication is set up between the primary node and the secondary node. In the FIG. 5 illustration, dashed lines represent the snapshot chain on the secondary. Light arrows indicate the snapshots of a volume. Dark arrows show replication from a snapshot volume to another.

In one embodiment, the process starts with creating the corresponding replica volume vr on the secondary node. Then the very first snapshot of vp, on the primary site is taken at t1, which is s1. In one embodiment, it is assumed that an imaginary snapshot s0 exists but it is empty. Then D01 corresponds to the content of vp at t1, i.e, s1. If vp is thinly provisioned then M01 would be the set of blocks that are allocated at t1. In one embodiment, a smaller M01 can be obtained if the blocks that are actually used by the application are identified, for example, using the file system interfaces. If none of these is available then M01 would be the set of all blocks reserved for vp.

The primary node then transfers M01 to the secondary node. Upon noticing the transfer of M01 the secondary creates the first snapshot of vr which is called s1 too since it will be synchronized with the s1 on the primary. The reason for establishing a snapshot relation between vr and s1 on the secondary site is to allow s1 to be rolled forward to vr when s1 is fully synchronized.

When M01 is completely transferred, a writable snapshot of s1 is taken on the secondary site, which is denoted by s1w. At this moment, an application can be mounted on s1w. A read operation from the application is first attempted to be served by s1w. If s1w does not include the blocks to be read then they are read from s1. A write operation on s1w simply means allocating the blocks for the write operation (e.g., if these blocks have not been allocated already because of an earlier write operation) and updating their content directly on s1w.

After M01 is replicated, the replication for D01 is initiated. The contents for the blocks pointed by M01 are read from s1 on the primary. While this replication is in progress, a new snapshot of vp can be taken at time t2. This will be s2. M12 are the set of blocks that have been updated on vp from t1 to t2.

Similarly, the transfer of M12 results in taking another snapshot of Vr, which is s2 on the secondary node. After M12 is replicated, a writable snapshot of s2 is taken on the secondary site, denoted by s2w, and the replication of D12 is initiated on the primary site. D12 is constructed by reading the blocks (pointed by M12) from s2. This process is repeated for subsequent snapshots taken on the primary, as shown in FIG. 7.

Figure 7:
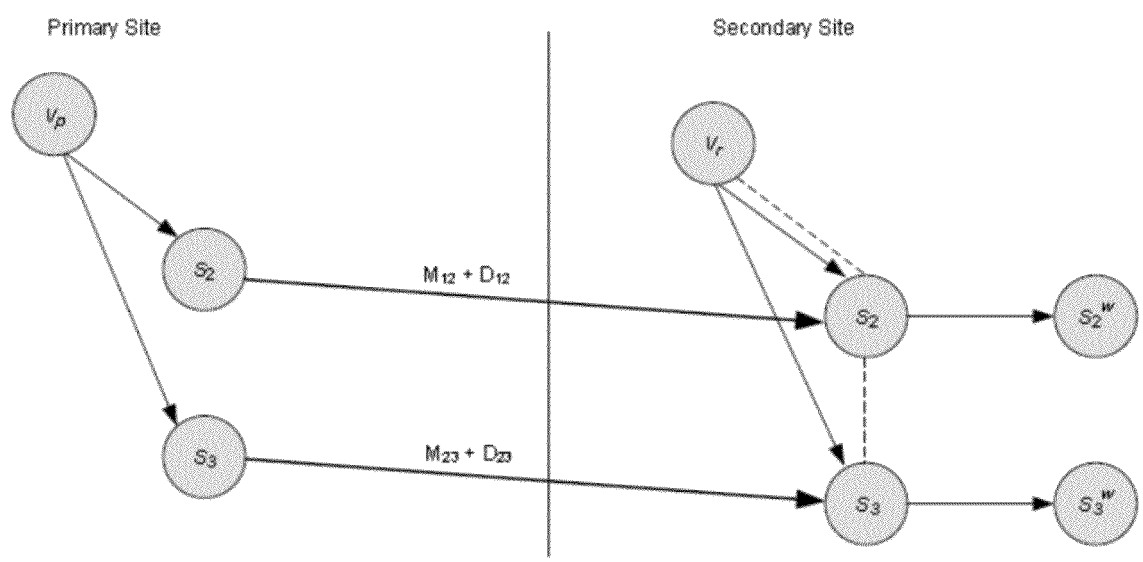
FIG. 7 shows a diagram of a replication snapshot chain process subsequent to a roll forward in accordance with one embodiment of the present invention.

FIG. 7 shows a diagram of a replication snapshot chain process 700 subsequent to a roll forward in accordance with one embodiment of the present invention. When a snapshot is completely replicated to the secondary site, it can be rolled forward to vr to reduce the number of volumes to manage, and to delete the snapshots that are no longer needed. FIG. 7 illustrates the snapshot chain after deleting s1, in accordance with a roll forward.

Figure 8:
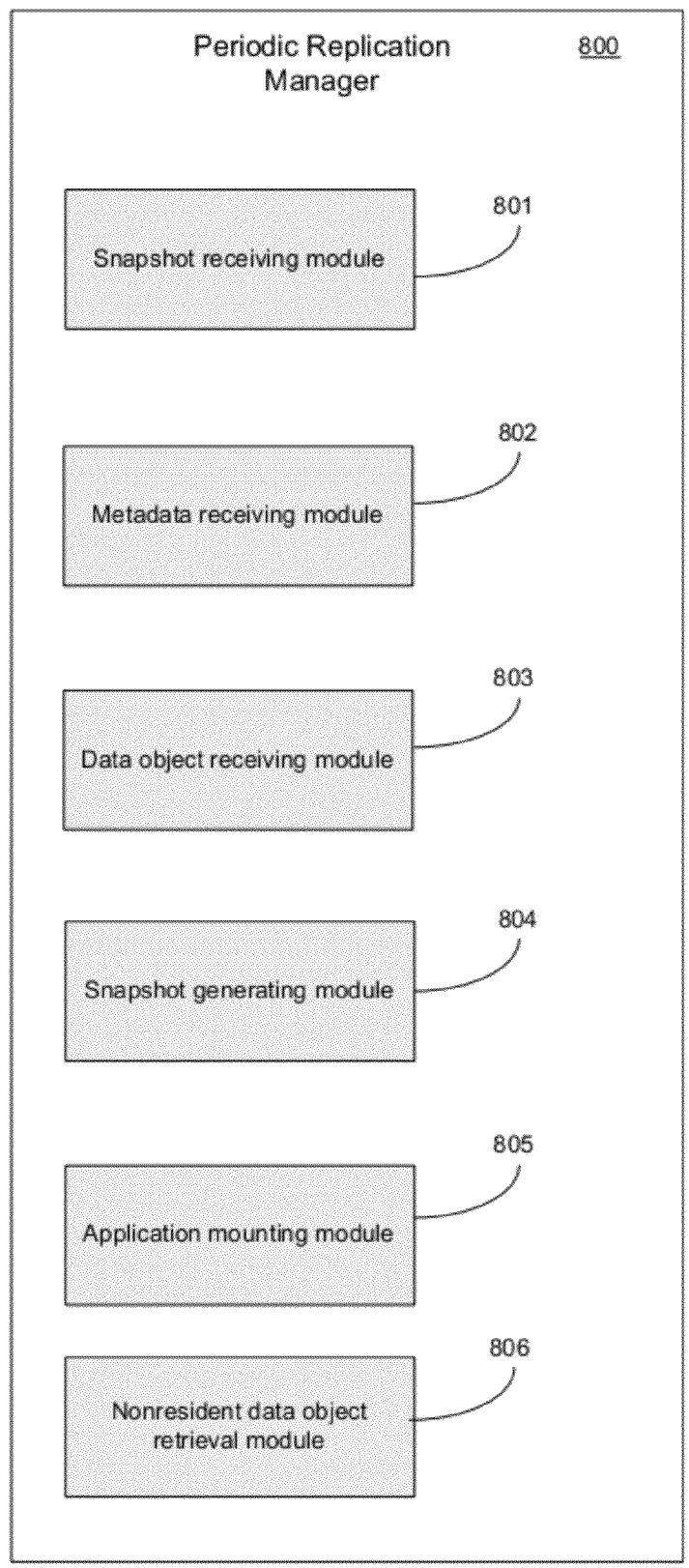
FIG. 8 shows a diagram of the various modules comprising a snapshot manager in accordance with one embodiment of the present invention.

FIG. 8 shows a diagram of the various modules comprising a periodic replication manager 800 in accordance with one embodiment of the present invention. As depicted in FIG. 8, periodic replication manager 800 shows the computer instantiated modules that provide functionality regarding the mounting of an application upon a partially replicated snapshot.

The periodic replication manager 800 includes a snapshot receiving module 801 which functions by receiving snapshots of a replication source. A metadata receiving module 802 receives metadata describing the contents of the set of data objects. A data object receiving module 803 receives a set of data objects from the replication source. A snapshot generating module 804 generates snapshots on the file system replication source by using the set of data objects. The application mounting module 805 mounts applications onto snapshots prior to receiving the set of data objects in their entirety. The non-resident data object retrieval module 806 functions by retrieving nonresident data objects and their accessed by an application.

Figure 9:
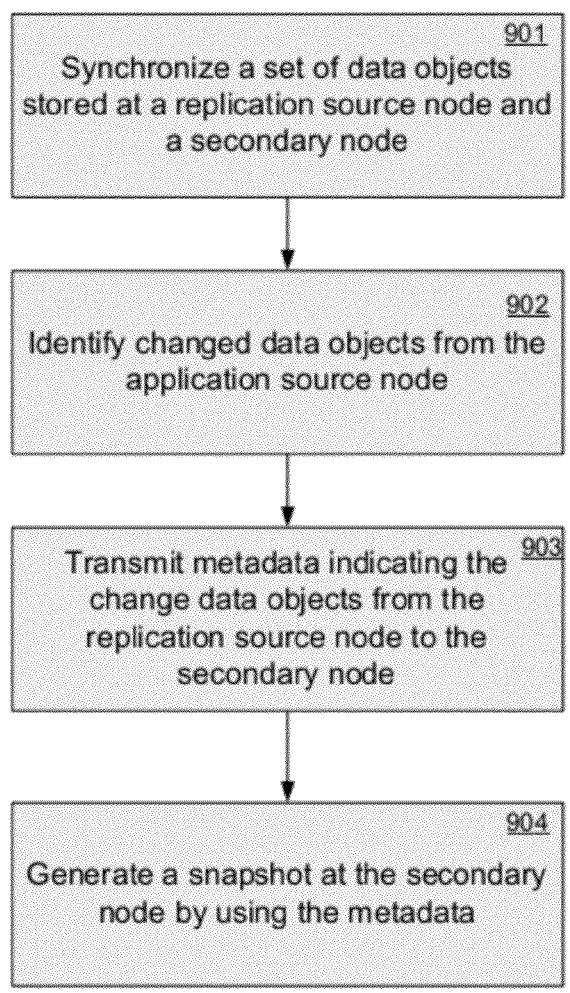
FIG. 9 shows a flowchart of an exemplary host-based replication snapshot process in accordance with one embodiment of the present invention.

FIG. 9 shows a flowchart of an exemplary host-based replication snapshot process 900 in accordance with one embodiment of the present invention. As depicted in FIG. 9, process 900 shows the basic operating steps of a host-based replication snapshot process as implemented by a computer system (e.g., computer system 1000 FIG. 10).

Process 900 begins with the step 901, which comprises synchronizing a set of data objects stored at both a replication source node and a secondary node. Step 902 comprises identifying changed data objects out of the set of data objects from the replication source node that have been modified during a time period between a first time and a subsequent second time. In step 903, metadata indicating the changed data objects from the replication source node is transmitted to the secondary node. In step 904, a snapshot is then generated at the second time on the secondary node by using the metadata.

Figure 10:
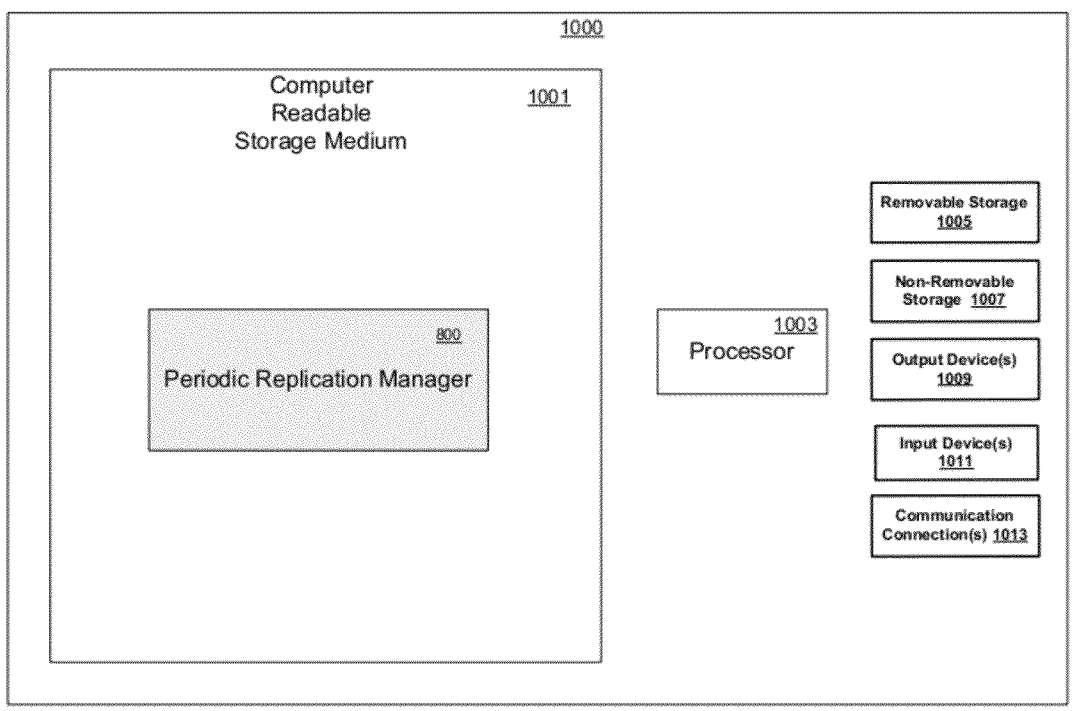
FIG. 10 shows an exemplary computer system according to one embodiment.

FIG. 10 shows an exemplary computer system 1000 according to one embodiment. Computer system 1000 depicts the components of a basic computer system providing the execution environment for certain hardware-based and software-based functionality for the above described embodiments. For example, computer system 1000 can be a system upon which the replication manager 800 and one or more software stacks from FIG. 1 are instantiated. Computer system 1000 can be implemented as, for example, a server computer system, workstation computer system, desktop computer system, or laptop computer system. Similarly, computer system 1000 can be implemented as a handheld device. Computer system 1000 typically includes at least some form of computer readable media (e.g., computer readable storage medium 1001). Computer readable media can be a number of different types of available media that can be accessed by computer system 1000 and can include, but is not limited to, computer storage media.

In its most basic configuration, computer system 1000 typically includes processing unit 1003 and a computer readable storage medium 1001. Depending on the exact configuration and type of computer system 1000 that is used, memory 1001 can be volatile (e.g., such as DRAM, etc.) 1001a, non-volatile 1001b (e.g., such as ROM, flash memory, etc.) or some combination of the two. Similarly, the memory 1001 can comprise other devices besides solid-state devices, such as, for example, magnetic disk-based media, optical media, or the like.

Additionally, computer system 1000 can include other mass storage systems (e.g., removable 1005 and/or non-removable 1007) such as magnetic or optical disks or tape. Similarly, computer system 1000 can include input devices 1009 and/or output devices 1011 (e.g., such as a display). Computer system 1000 can further include network connections 1013 to other devices, computers, networks, servers, etc. using either wired or wireless media. As all of these devices are well known in the art, they need not be discussed in detail.

It should further be noted, that the computer system 1000 can have some, most, or all of its functionality supplanted by a distributed computer system having a large number of dispersed computing nodes, such as would be the case where the functionality of the computer system 1000 is partly or wholly executed using a cloud computing environment.

Figure 11:
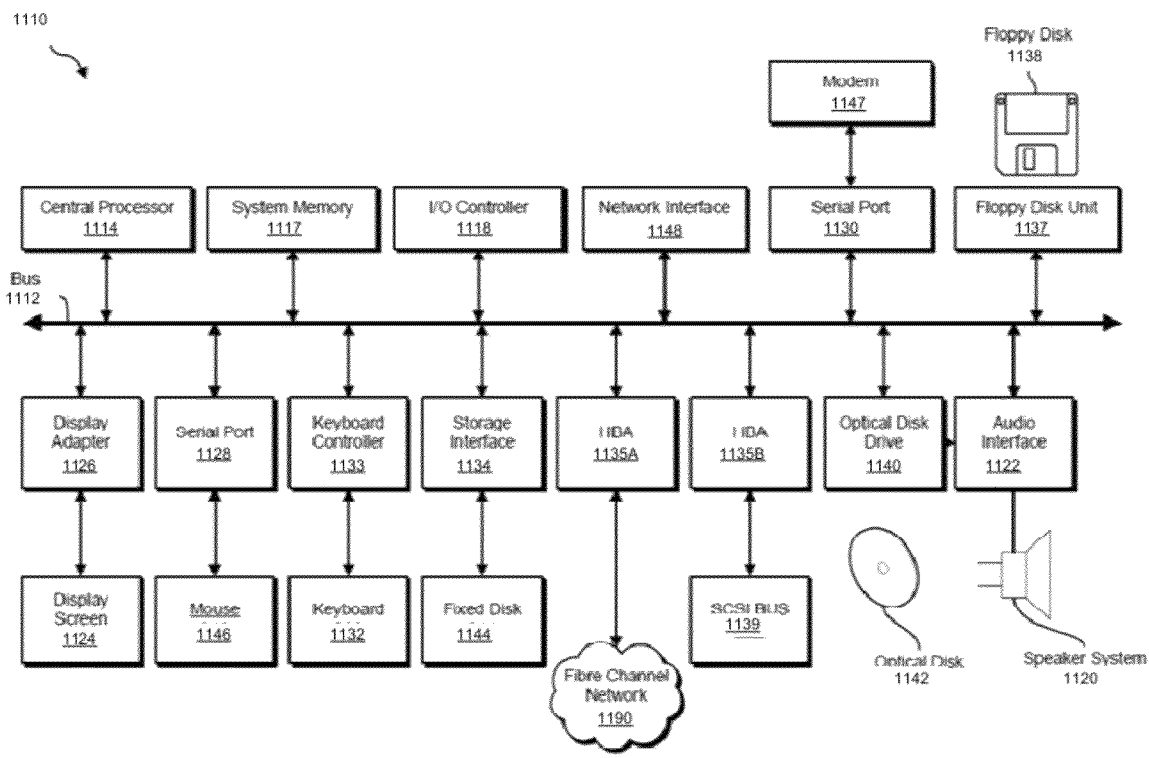
FIG. 11 depicts a block diagram of a computer system suitable for implementing certain functionality in accordance with one embodiment of the present invention.

FIG. 11 depicts a block diagram of a computer system 1110 suitable for implementing certain functionality in accordance with one embodiment of the present invention. Computer system 1110 includes a bus 1112 which interconnects major subsystems of computer system 1110, such as a central processor 1114, a system memory 1117 (typically RAM, but which may also include ROM, flash RAM, or the like), an input/output controller 1118, an external audio device, such as a speaker system 1120 via an audio output interface 1122, an external device, such as a display screen 1124 via display adapter 1126, serial ports 1128 and 1130, a keyboard 1132 (interfaced with a keyboard controller 1133), a storage interface 1134, a floppy disk drive 1137 operative to receive a floppy disk 1138, a host bus adapter (HBA) interface card 1135A operative to connect with a Fibre Channel network 1190, a host bus adapter (HBA) interface card 1135B operative to connect to a SCSI bus 1139, and an optical disk drive 1140 operative to receive an optical disk 1142. Also included are a mouse 1146 (or other point-and-click device, coupled to bus 1112 via serial port 1128), a modem 1147 (coupled to bus 1112 via serial port 1130), and a network interface 1148 (coupled directly to bus 1112).

Bus 1112 allows data communication between central processor 1114 and system memory 1117, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 1110 are generally stored on and accessed via a computer readable medium, such as a hard disk drive (e.g., fixed disk 1144), an optical drive (e.g., optical drive 1140), a floppy disk unit 1137, or other storage medium. Additionally, applications can be in the form of electronic signals modulated in accordance with the application and data communication technology when accessed via network modem 1147 or interface 1148.

Storage interface 1134, as with the other storage interfaces of computer system 1110, can connect to a standard computer readable medium for storage and/or retrieval of information, such as a fixed disk drive 1144. Fixed disk drive 1144 may be a part of computer system 1110 or may be separate and accessed through other interface systems. Modem 1147 may provide a direct connection to a remote server via a telephone link or to the Internet via an internet service provider (ISP). Network interface 1148 may provide a direct connection to a remote server via a direct network link to the Internet via a POP (point of presence). Network interface 1148 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 11 need not be present to practice the present disclosure. The devices and subsystems can be interconnected in different ways from that shown in FIG. 11. The operation of a computer system such as that shown in FIG. 11 is readily known in the art and is not discussed in detail in this application. Code to implement the present disclosure can be stored in computer-readable storage media such as one or more of system memory 1117, fixed disk 1144, optical disk 1142, or floppy disk 1138. The operating system provided on computer system 1110 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing description, for the purpose of explanation, has been described with reference to specific embodiments. However, the illustrated discussions above are not intended to be exhaustive or to limit the invention to the precise forms disclosed. Many modifications and variations are possible in view of the above teachings. Embodiments were chosen and described in order to best explain the principles of the invention and its practical applications, to thereby enable others skilled in the art to best utilize the invention and various embodiments with various modifications as may be suited to the particular use contemplated.

What is claimed is:

1. A host-based replication snapshot method, comprising:
    synchronizing a set of data objects stored at both a replication source node and a secondary node;
    identifying changed data objects out of the set of data objects from the replication source node that have been modified during a time period between a first time and a subsequent second time;
    transmitting metadata indicating the changed data objects from the replication source node to the secondary node;
    generating a snapshot at the second time on the secondary node by using the metadata; and
    mounting an application onto the snapshot at the secondary node by using the synchronized set of data objects stored at the secondary node and the metadata, wherein the application is mounted on the snapshot prior to transmitting the changed data objects from the replication source node to the secondary node, and wherein the set of data objects stored at both the replication source node and the secondary node are synchronized prior to mounting the application.

2. The method of claim 1, wherein the application is a fire drill application.

3. The method of claim 1, wherein the metadata is used to identify data objects that have been modified out of the set of data objects during the time period between the first time and the subsequent second time.

4. The method of claim 1, wherein the set of data objects comprise a file system of a LUN (logical unit number) of a storage array, and wherein the storage array supports hardware-based replication.

5. The method of claim 1, wherein a replication process implemented between the repetition source node and the secondary node is synchronous, asynchronous or periodic.

6. The method of claim 1, wherein a change tracking agent is instantiated on the replication source node for identifying changed data objects out of the set of data objects from the replication source node that have been modified during the time period between the first time and the subsequent second time.

7. A non-transitory computer readable storage medium having stored thereon, computer executable instructions that, if executed by a computer system cause the computer system to perform a method comprising:
    synchronizing a set of data objects stored at both a replication source node and a secondary node;
    identifying changed data objects out of the set of data objects from the replication source node that have been modified during a time period between a first time and a subsequent second time;
    transmitting metadata indicating the changed data objects from the replication source node to the secondary node;
    generating a snapshot at the second time on the secondary node by using the metadata; and
    mounting an application onto the snapshot at the secondary node by using the synchronized set of data objects stored at the secondary node and the metadata, wherein the application is mounted on the snapshot prior to transmitting the changed data objects from the replication source node to the secondary node, and wherein the set of data objects stored at both the replication source node and the secondary node are synchronized prior to mounting the application.

8. The non-transitory computer readable storage medium of claim 7, wherein the application is a fire drill application.

9. The non-transitory computer readable storage medium of claim 7, wherein the metadata is used to identify data objects that have been modified out of the set of data objects during the time period between the first time and the subsequent second time.

10. The non-transitory computer readable storage medium of claim 7, wherein the set of data objects comprise a file system of a LUN (logical unit number) of a storage array, and wherein the storage array supports hardware-based replication.

11. The non-transitory computer readable storage medium of claim 7, wherein a replication process implemented between the repetition source node and the secondary node is synchronous, asynchronous or periodic.

12. The non-transitory computer readable storage medium of claim 7, wherein a change tracking agent is instantiated on the replication source node for identifying changed data objects out of the set of data objects from the replication source node that have been modified during the time period between the first time and the subsequent second time.

13. A volume replication system, comprising:
    a computer system having a processor coupled to a computer readable storage media and executing computer readable code which causes the computer system to implement a snapshot manager module for a replication source node, wherein the snapshot manager module:
    synchronizes a set of data objects stored at both the replication source node and at a secondary node;
    identifies changed data objects out of the set of data objects from the replication source node that have been modified during a time period between a first time and a subsequent second time;
    transmits metadata indicating the changed data objects from the replication source node to the secondary node;
    acknowledges the generating of a snapshot at the second time on the secondary node based on the metadata; and
    mounts an application onto the snapshot at the secondary node by using the synchronized set of data objects stored at the secondary node and the metadata, wherein the application is mounted on the snapshot prior to transmitting the changed data objects from the replication source node to the secondary node, and wherein the set of data objects stored at both the replication source node and the secondary node are synchronized prior to mounting the application.

14. The system of claim 13, wherein the application is a fire drill application.

15. The system of claim 13, wherein the metadata is used to identify data objects that have been modified out of the set of data objects during the time period between the first time and the subsequent second time.

16. The system of claim 13, wherein the set of data objects comprise a file system of a LUN (logical unit number) of a storage array, and wherein the storage array supports hardware-based replication.

17. The system of claim 13, wherein a replication process implemented between the repetition source node and the secondary node is synchronous, asynchronous or periodic.

18. The method of claim 1, further comprising:

generating, at the replication source node, a first snapshot of the set of data objects stored at the replication source node at the first time;

generating, at the replication source node, a second snapshot of the set of data objects stored at the replication source node at the subsequent second time; and transmitting the changed data objects from the replication source node to the secondary node subsequent to transmitting the metadata.

19. The method of claim 1, wherein the metadata indicates an address and a field length of each of the changed data objects.

20. The method of claim 1, further comprising:

transmitting a portion of the changed data objects from the replication source node to the secondary node out of order based on a read request from the application mounted at the secondary node, wherein the application mounted at the secondary node is different from a replication manager at the secondary node configured to generate the snapshot at the second time on the secondary node.

* * * * *